United States Patent
Laine (10) Patent No.: US 9,245,363 B2
(45) Date of Patent: Jan. 26, 2016

(54) SYSTEM, METHOD, AND COMPUTER PROGRAM PRODUCT IMPLEMENTING AN ALGORITHM FOR PERFORMING THIN VOXELIZATION OF A THREE-DIMENSIONAL MODEL

(71) Applicant: NVIDIA Corporation, Santa Clara, CA (US)

(72) Inventor: Samuli Matias Laine, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 392 days.

(21) Appl. No.: 13/725,015

(22) Filed: Dec. 21, 2012

(65) Prior Publication Data

US 2014/0176545 A1    Jun. 26, 2014

(51) Int. Cl.
  *G06T 11/40* (2006.01)
  *G06T 17/00* (2006.01)
  *G06T 15/08* (2011.01)
(52) U.S. Cl.
  CPC .............. *G06T 11/40* (2013.01); *G06T 17/00* (2013.01); *G06T 15/08* (2013.01)
(58) Field of Classification Search
  CPC ........................................................ G06T 15/08
  USPC .............................................. 345/6, 419, 424
  See application file for complete search history.

(56) References Cited

U.S. PATENT DOCUMENTS

2005/0030317 A1*   2/2005   Spicer ........................ 345/582
2008/0012853 A1*   1/2008   Geiger ........................ 345/420

OTHER PUBLICATIONS

Rauwendaal, "Hybrid Computational Voxelization Using the Graphics Pipeline"; A Thesis submitted to Oregon State University, Nov. 29, 2012.*
Cohen-Or, D. et al., "Fundamentals of Surface Voxelization," Graphical Models and Image Processing, Nov. 1995, vol. 57, No. 6, pp. 453-461.
Huang, J. et al., "An Accurate Method for Voxelizing Polygon Meshes," 1998, pp. 1-9.
Schwarz, M. et al., "Fast Parallel Surface and Solid Voxelization on GPUs," 2010, pp. 1-9.

* cited by examiner

*Primary Examiner* — Maurice L McDowell, Jr.
(74) *Attorney, Agent, or Firm* — Zilka-Kotab, PC (57) ABSTRACT

A system, method, and computer program product for implementing an algorithm for performing thin voxelization is disclosed. The thin voxelization algorithm receives a surface, maps the surface onto a plurality of volumetric picture elements (voxels), and generates a value for each voxel in the plurality of voxels that intersects with the surface. A voxel intersects with the surface when the surface intersects a crosshair shape associated with the voxel.

20 Claims, 10 Drawing Sheets

SYSTEM, METHOD, AND COMPUTER PROGRAM PRODUCT IMPLEMENTING AN ALGORITHM FOR PERFORMING THIN VOXELIZATION OF A THREE-DIMENSIONAL MODEL

FIELD OF THE INVENTION

The present invention relates to image processing, and more particularly to voxelization,

BACKGROUND

Conventional techniques for rendering three-dimensional (3D) models into two-dimensional (2D) images are directed towards projecting 3D surfaces onto a 2D image plane. The image plane is divided into a 2D array of pixels (picture elements) that represent values corresponding to a particular point in the image plane. Each pixel may represent the color of a surface at a point intersected by a ray originating at a viewing position that passes through the point in the image plane associated with the pixel. The techniques for rendering 3D models into 2D images include rasterization and ray-tracing.

Voxelization is a 3D equivalent to the 2D techniques discussed above. Instead of projecting 3D surfaces onto a 2D image plane, 3D surfaces are rendered onto a regular grid of discretized volume elements in a 3D space. A voxel (volumetric picture element) is a volume element, such as a cube, that represents a value of a 3D surface or solid geometric element at a point in the 3D space. There are multiple techniques for rendering 3D model data into a 3D image comprising a plurality of voxels.

Solid voxelization is one technique that is effective for use with 3D models that include objects defined as a closed mesh. For each object, a plurality of voxels that intersect the closed mesh are tagged and a value is calculated for each of the tagged voxels. However, 3D models in conventional graphics are typically defined using open meshes (i.e., thin surfaces). Because the surfaces do not have a thickness, it is possible that rendering algorithms tailored to solid voxelization may fail. A second technique, surface voxelization, is more suited to rendering of open meshes. Instead of calculating a value for each voxel enclosed within the mesh, values are only calculated for the voxels that intersect the surface of the mesh (i.e., excluding voxels enclosed within the mesh that do not intersect the surface of the mesh). Surface voxelization is useful in applications that need to retain the separation properties of a surface, such as techniques for generating computer generated graphics using ray-tracing with voxel data.

However, there are problems with conventional techniques for surface voxelization. For example, where the surface intersects with the corner of a voxel, conventional surface voxelization techniques may render the voxel even though the voxel does not contribute to the final result. Rendering unnecessary voxels decreases performance of the rendering system. Thus, there is a need for more accurate surface voxelization techniques that address this issue and/or other issues associated with the prior art.

SUMMARY

A system, method, and computer program product for implementing an algorithm for performing thin voxelization is disclosed. The thin voxelization algorithm receives a surface, maps the surface onto a plurality of volumetric picture elements (voxels), and generates a value for each voxel in the plurality of voxels that intersects with the surface. A voxel intersects with the surface when the surface intersects a crosshair shape associated with the voxel.

DETAILED DESCRIPTION

A technique for performing thin voxelization of a surface, described more fully below, accurately maps the surface to a regularly spaced array of sample points in a 3D model space. Various embodiments of the thin voxelization algorithm may be implemented in hardware, software, or combinations thereof. For example, in one embodiment, the thin voxelization algorithm may be implemented in an application specific integrated circuit (ASIC). In another embodiment, the thin voxelization algorithm may be implemented in software executed on a central processing unit (CPU). In yet other embodiments, at least a portion of the thin voxelization algorithm may be implemented in specialized software configured for execution in a highly parallel processor such as a graphics processing unit (GPU).

Figure 1:
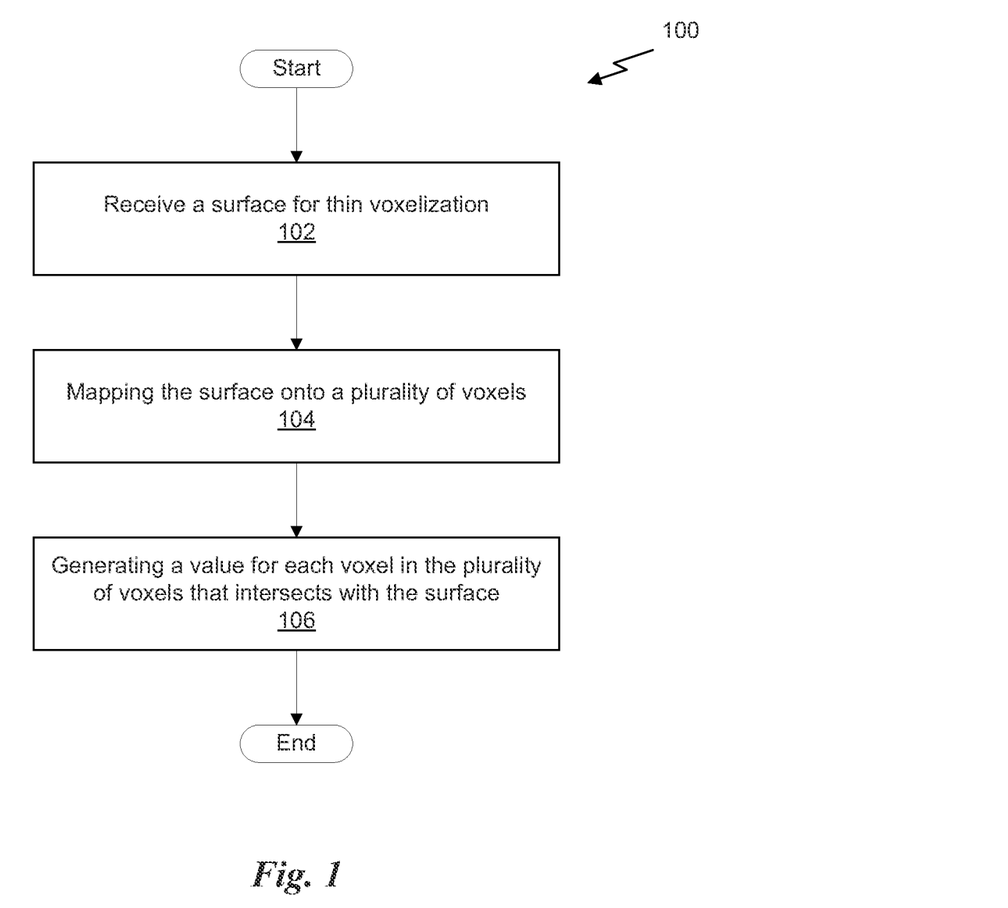
FIG. 1 illustrates a flowchart of a method implemented by a thin voxelization algorithm, in accordance with one embodiment.

FIG. 1 illustrates a flowchart of a method 100 implemented by a thin voxelization algorithm, in accordance with one embodiment. At step 102, a processing engine receives a surface for thin voxelization. In one embodiment, the processing engine is a software engine configured to be executed by a generalized processor such as a central processing unit (CPU) or a graphics processing unit (GPU). In another embodiment, the processing engine is a dedicated hardware engine such as a specialized hardware unit in a GPU or an application specific integrated circuit (ASIC) configured to implement the thin voxelization algorithm. At step 104, the processing engine maps the surface onto a plurality of voxels. In one embodiment, the plurality of voxels is a regularly spaced grid of volumetric elements, such as cubic volumes arranged in a 3D array oriented along the model space x, y, and z axes. For example, the model space may be divided into an array of regularly spaced voxels having 1024 voxels in the x dimension, 1024 voxels in the y dimension, and 1024 voxels in the z dimension. It will be appreciated that the number of voxels in each direction does not need to be uniform. In another embodiment, the plurality of voxels may not be regularly spaced and each voxel may be irregularly shaped. For example, the plurality of voxels may be arranged in the shape of a frustum of a rectangular pyramid.

At step 106, the processing engine generates a value for each voxel in the plurality of voxels that intersects with the surface. A voxel intersects with the surface when the surface intersects a crosshair shape associated with the voxel. In one embodiment, the value is a scalar value, which may represent a value such as opacity (or transparency) for the voxel (e.g., in Hounsfield units in the case of CT scans). In another embodiment, the value is a vector value, which may represent, e.g., a color for the voxel. The color may include multiple channels associated with scalar values. For example, the color may include three channels—a red channel, a blue channel, and a green channel. The color may also include a fourth channel—an alpha channel. Other types of color formats may also be represented by vector values (e.g., CYMK, YUV, etc.). The value may be generated based on an interpolation based on the location of the voxel and attributes associated with two or more vertices of the surface. It should be noted that, while various optional features are set forth herein in connection with the thin voxelization algorithm set forth above, such features are for illustrative purposes only and should not be construed as limiting in any manner.

Figure 2:
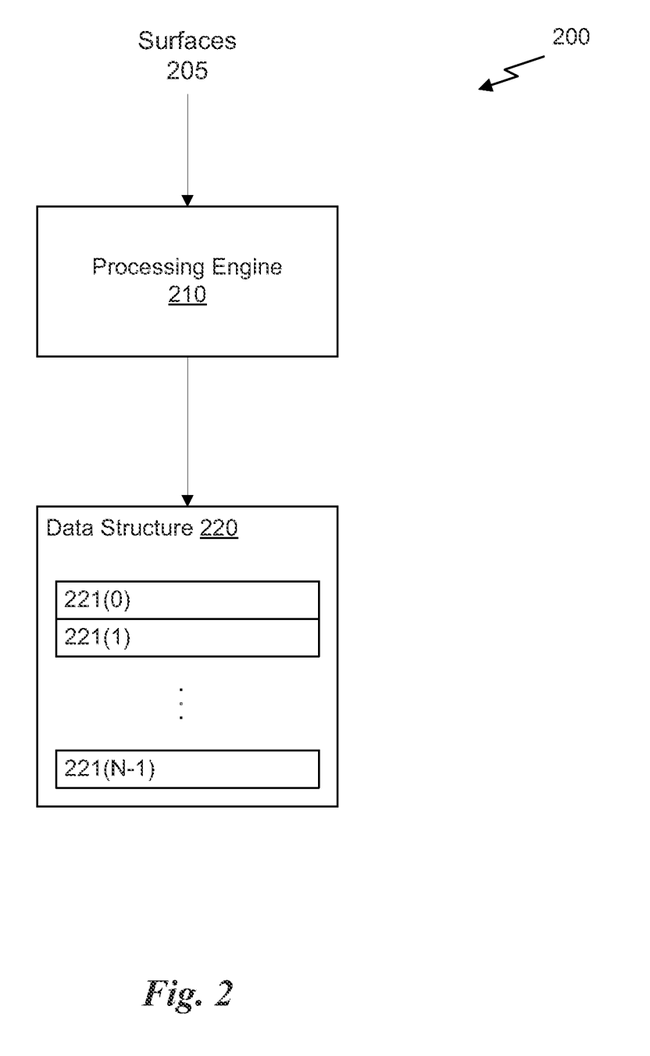
FIG. 2 illustrates a system that implements the thin voxelization algorithm of FIG. 1, in accordance with one embodiment.

FIG. 2 illustrates a system 200 that implements the thin voxelization algorithm of FIG. 1, in accordance with one embodiment. The system 200 includes a processing engine 210 that is configured to receive a stream of surfaces 205. The processing engine 210 is configured to implement the thin voxelization algorithm set forth above in steps 102 through 106. Again, the processing engine may be implemented as software, hardware, or a combination of hardware and software.

The processing engine 210 is configured to store values in a data structure 220 that represents the voxel grid (i.e., the plurality of voxels). The data structure 220 includes N values 221, one value for each voxel in the voxel grid, and is stored in a memory accessible by the processing engine 210. Similar to a digital image, which is a data structure that represents a 2D array of pixels, the data structure 220 includes an array of values 221, each value representing one of the voxels in the voxel grid. In one embodiment, each value 221 is 4 bytes in size and stores one 32-bit scalar value. In another embodiment, each value 221 is 4 bytes in size and stores a vector having up to four components of 8-bits each. For example, the 4 byte vector may include an 8-bit value for a red channel (i.e., 0-255), an 8-bit value for a green channel, an 8-bit value for a blue channel, and, optionally, an 8-bit value for an alpha channel. In yet other embodiments, each value 221 may be more or less than 4 bytes in size. For example, each value may be 12 bytes in size and store 32-bit floating point values for the red channel, the green channel, and the blue channel. Other types and sizes of data may be stored in each value 221 as the particular implementation requires.

Figure 3A:
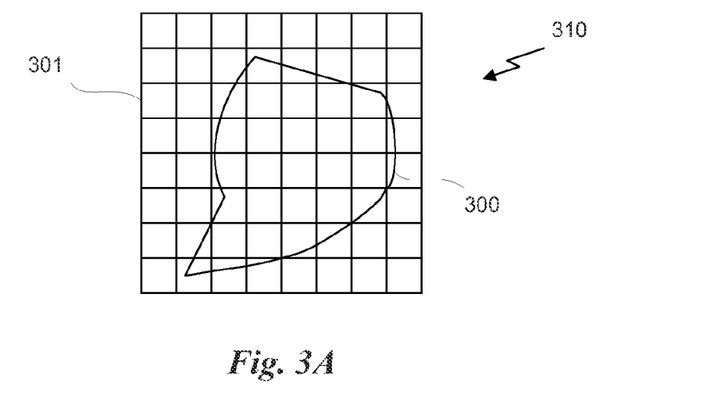
FIGS. 3A through 3C show conceptual illustrations of 2D analogues for thick and thin surface voxelization, in accordance with one embodiment.
Figure 3B:
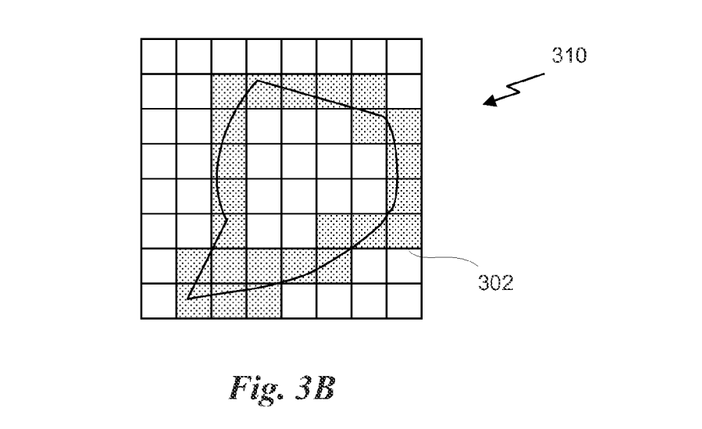
Figure 3C:
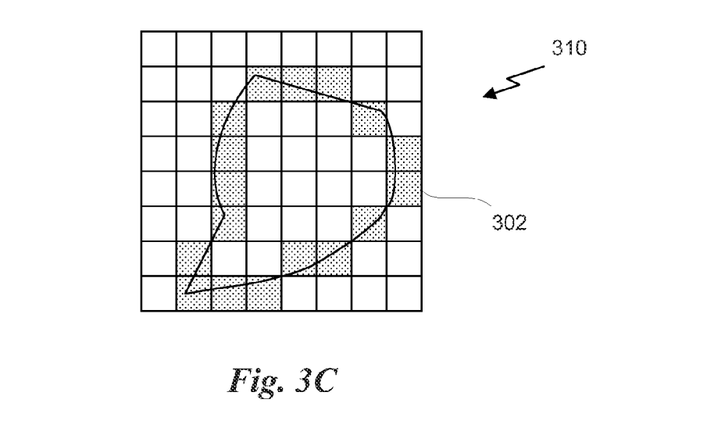

FIGS. 3A through 3C show conceptual illustrations of 2D analogues for thick and thin surface voxelization, in accordance with one embodiment. As shown in FIG. 3A, a model space is divided into a voxel grid 310. Although the voxel grid 310 is shown as a 2D array of voxels 301, a typical voxel grid divides the model space into discreet volumetric elements in three dimensions. The voxel grid 310 shown in FIG. 3A is, conceptually, a cross-sectional slice of the 3D voxel grid. A cross-section of a mesh 300 is shown overlaid on the voxel grid 310. The mesh 300 includes a plurality of 3D graphics primitives (i.e., surfaces) such as a plurality of triangles (i.e., three vertices) or quads (i.e., four vertices). Each vertex of a surface may include one or more vertex attributes such as colors, texture coordinates, surface normal, etc.

Surface voxelization of the mesh 300 is performed by determining which voxels 301 in the voxel grid 310 intersect with at least one surface of the mesh 300. For each graphics primitive in mesh 300, the graphics primitive is intersected with each of the voxels 301 in the voxel grid 310 to determine which voxels 301 intersect with the graphics primitive. Each voxel 301 that intersects the graphics primitive is tagged, and a value is calculated for the tagged voxels based on the attributes associated with the surface of the mesh 300. Thick surface voxelization generates a value for each voxel that is intersected by any point on the mesh 300. For example, as shown in FIG. 3B, the tagged voxels 302 are indicated using shading. In thick surface voxelization, every voxel that includes any point of any of the surfaces included in mesh 300 is tagged. In contrast, as shown in FIG. 3C, thin voxelization generates a value for a plurality of voxels 301 that intersect a surface of the mesh 300, but not every voxel that includes any point of any of the surfaces. In other words, fewer voxels 301 are selected (i.e., tagged) in the thin voxelization algorithm illustrated in FIG. 3C than the thick voxelization algorithm of FIG. 3B.

The thin voxelization algorithm maintains separation properties (e.g., water-tightness) of the original mesh 300 and is a more compact representation of the mesh 300. Separation properties maintain that a line from the center of one voxel to the center of an adjacent voxel (only in the x, y, or z directions, not in a diagonal direction) cannot simultaneously move from an untagged voxel to an untagged voxel while intersecting a point on a surface of the mesh 300. In certain cases, the number of tagged voxels using the thick voxelization approach can be approximately two to three times the number of tagged voxels using the thin voxelization approach. Thin voxelization is better suited to some types of algorithms and reduces the number of calculations performed because the number of tagged voxels 302 is reduced.

Figure 4A:
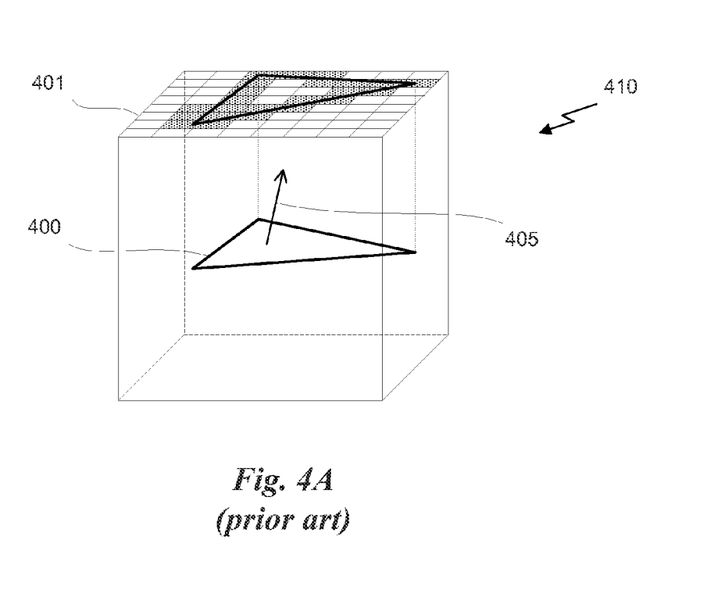
FIGS. 4A through 4C illustrate one approach for performing thin voxelization, according to the prior art.
Figure 4B:
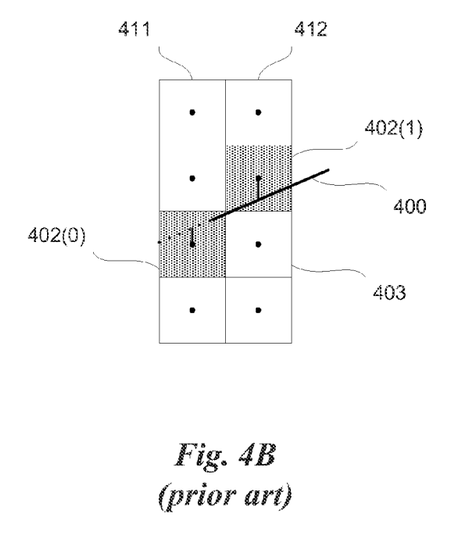
Figure 4C:
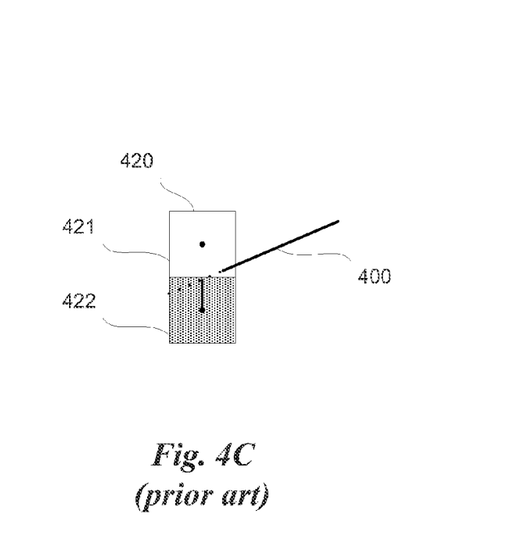

Multiple approaches have been tried for generating an accurate thin voxelization of a generic 3D surface. FIGS. 4A through 4C illustrate one approach for performing thin voxelization, according to the prior art. As shown in FIG. 4A, a surface 400 is shown in a voxel grid 410. The surface 400 is projected onto a 2D plane along the dominant dimension of the normal 405 for the surface 400 (i.e., the normal for the plane formed by the three vertices of surface 400). As shown in FIG. 4A, the normal 405 for the surface 400 has a dominant dimension along the z-axis. Therefore, the surface 400 is projected to a plane at $z=z_{max}$ (or any other value of z such as z=0). Each column of voxels covered by any point on the edges of the projected surface are then tested to find exactly one voxel 401 in the column of voxels that has a location that is closest to the plane of the surface 400.

As shown in FIG. 4B, the projection of surface 400 along the z-axis intersects with a first column of voxels 411 and a second column of voxels 412. Exactly one voxel from the first column of voxels 411 and one voxel from the second column of voxels 412 is selected and a value for those voxels is generated based on the attributes of the surface 400. The particular voxel that is selected is the voxel in the column having a location closest to the plane that is co-planar with the surface 400. For example, as shown in FIG. 4B, the center (i.e., location) of voxel 402(0) is closest to the plane of surface 400 in the first column of voxels 411, and the center of voxel 402(1) is closest to the plane of the surface 400 in the second column of voxels 412. The process described above results in a thin voxelization of the surface 400. Even though the surface 400 intersects with a third voxel 403, the third voxel 403 is not selected because the surface 400 is closer to voxel 402(1) in the second column of voxels 412, and only one voxel is selected per column of voxels.

However, the approach illustrated in FIGS. 4A and 4B is not accurate in certain situations. For example, as shown in FIG. 4C, the surface 400 may end just inside of a first voxel 421 and, therefore, the projection of the surface 400 intersects with a column of voxels 420. However, even though the surface 400 does not intersect with a second voxel 422, the plane of surface 400 is closer to the center of voxel 422 than the center of voxel 421 and, therefore, the second voxel 422 will be incorrectly selected and a value for the second voxel 422 is generated based on the attributes of the surface 400. Consequently, a more accurate approach for performing thin voxelization of generic surfaces is desired.

Figure 5A:
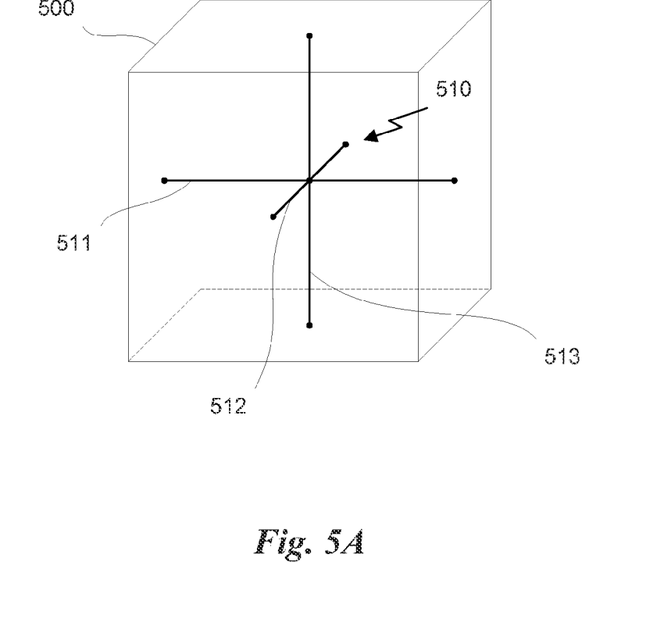
FIG. 5A illustrates a voxel that includes a crosshair shape, in accordance with one embodiment.

FIG. 5A illustrates a voxel 500 that includes a crosshair shape 510, in accordance with one embodiment. Determining whether a voxel 500 should be tagged involves intersecting a surface (e.g. surface 400) with the crosshair shape 510 included within the volume defined by the voxel 500. In one embodiment, the crosshair shape 510 is located at the center of the voxel 500 and includes three orthogonal axes—an x-axis 511, a y-axis 512, and a z-axis 513. The axes are centered at an origin at the center of the voxel 500. The surface intersects the crosshair shape 510 when any point on the surface lies on any one of the three axes of the crosshair shape 510.

In one embodiment, a technique for performing thin voxelization using the voxel 500 is similar to the technique illustrated by FIGS. 4A through 4C, set forth above. First, a projection of a surface 400 is used to find a subset of columns of voxels that the surface 400 intersects. Then, for each voxel in the subset of the columns of voxels, the surface 400 is intersected against the crosshair shape 510 included in the voxel 500. Different embodiments may use different techniques for determining which voxels to test against the crosshair shape 510. In one embodiment, every voxel in each of the columns in the subset of columns may be tested. In another embodiment, only those voxels in the subset of columns that include a piece of the surface 400 are tested. For example, the surface 400 may be tested against a bounding volume defined by the extents of the voxel. In another more conservative approach, a bounding volume may be defined that contains the surface 400 and the bounding volume may be tested against a bounding volume defined by the extents of the voxel. In yet another embodiment, only one voxel per column is tested. In such an embodiment, the particular voxel selected from each column may be the voxel that includes a center closest to the plane of the surface. In other words, selecting the voxel to test is similar to the technique illustrated by FIGS. 4A through 4C, but the voxel is only tagged if the closest voxel intersects the crosshair shape 510. It will be appreciated that this technique may only work with crosshair shapes 510 that are centered in the voxel.

If the surface 400 intersects with any of the axes (e.g., 511, 512, or 513) of the crosshair 510, then that voxel 500 is tagged, and a value for the tagged voxel is generated based on the attributes of the surface 400 at the location corresponding to the voxel 500. Intersecting the surface 400 with the plurality of crosshairs 510 corresponding to the plurality of voxels 500 in a voxel grid 410 yields a thin voxelization of the surface 400 that maintains the separation properties desired for accurate thin voxelization and ensures that no voxels are tagged that do not contain any point on the surface 400.

It will be appreciated that the thin voxelization algorithm using the crosshair shape 510 may result in some voxels that are not tagged even though they include a portion of the surface 400. For example, in the case where the surface 400 intrudes into the voxel 500 at a corner of the volume occupied by the voxel 500, the surface 400 may not intersect any of the axes (e.g., 511, 512, or 513). Thus, this technique results in a thin voxelization of the surface 400.

Figure 5B:
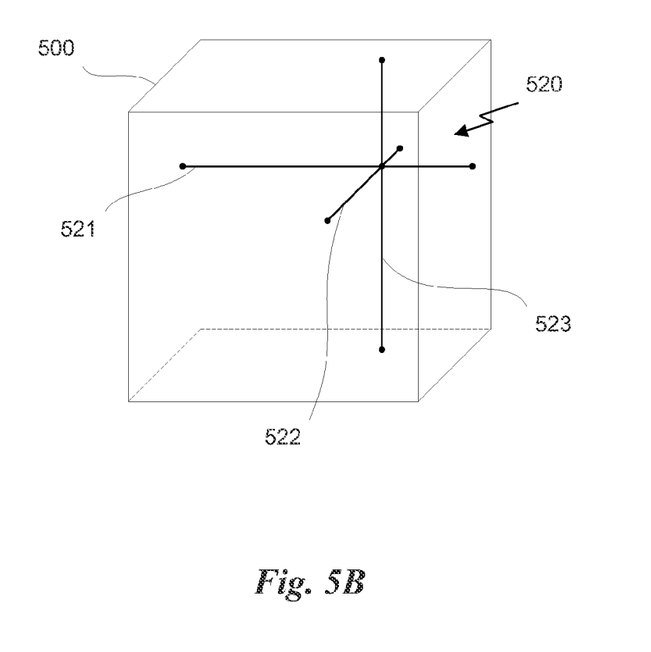
FIG. 5B illustrates a voxel that includes a crosshair shape, in accordance with another embodiment.

FIG. 5B illustrates a voxel 500 that includes a crosshair shape 520, in accordance with another embodiment. As shown in FIG. 5B, the crosshair shape 520 is similar to the crosshair shape 510 except that the origin of the crosshair shape 520 is offset from the center of the voxel 500. The crosshair shape 520 includes three orthogonal axes an x-axis 521, a y-axis 522, and a z-axis 523. IU such other embodiments, the axes do not intersect the faces of the voxel 500 at a centroid (i.e., barycenter) of the face. It will be appreciated that the important attribute of the crosshairs 520 is that each axis (e.g., 521, 522, and 523) is co-linear with an axis included in a crosshair 520 in an adjacent voxel. In other words, a surface cannot pass through two adjacent voxels without intersecting at least one axis of the crosshair shape 520 (assuming that the width of the surface in each dimension is at least the width of a voxel).

Figure 5C:
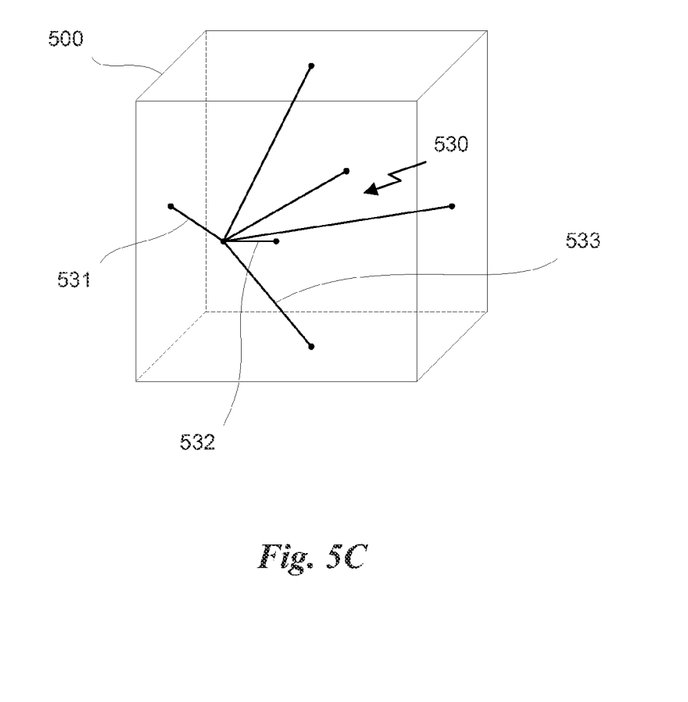
FIG. 5C illustrates a voxel that includes a crosshair shape, in accordance with yet another embodiment.

FIG. 5C illustrates a voxel 500 that includes a crosshair shape 530, in accordance with yet another embodiment. The crosshair shape 530 includes three axes—an x-axis 531, a y-axis 532, and a z-axis 533. The axes (i.e., 531, 532, and 533) are polylines having two segments: a first segment from a centroid of a first face of the voxel 500 to an origin of the crosshair 530, and a second segment from the origin of the crosshair 530 to a centroid of a second face of the voxel 500. The first face and the second faces are opposite faces of the voxel. Although shown as polylines in FIG. 5C, it will be appreciated that, in other embodiments, the axes (e.g., 531, 532, and 533) may be any continuous curve between the centroids of opposite faces of the voxel 500 that pass through the origin of the crosshair 530.

Figure 5D:
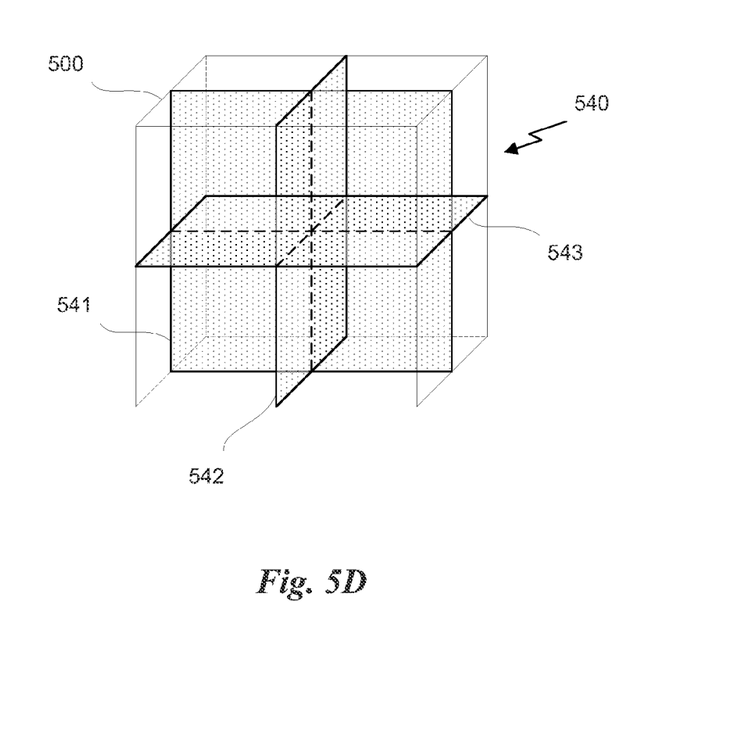
FIG. 5D illustrates a voxel that includes a crosshair shape, in accordance with yet another embodiment.

FIG. 5D illustrates a voxel 500 that includes a crosshair shape 540, in accordance with yet another embodiment. The crosshair shape 540 includes three planes—an x-plane 541, a y-plane 542, and a z-plane 543. The planes (i.e., 541, 542, and 543) are surfaces that are parallel to the faces of the voxel and intersect the center of the voxel at an origin of the crosshair shape 540. The planes are similar to the crosshair shapes (i.e., 510, 520, 530, etc.) comprising a set of axes, but extended in two dimensions. This embodiment of the crosshair shape 540 may be desirable when surfaces 400 have a width in at least one direction that is less than the width of a voxel. In other words, with the crosshair shapes comprising a set of axes, a surface could be defined that was long and skinny that intersects with a plurality of voxels, but does not intersect with any of the crosshair shapes. Thus, this two dimensional crosshair shape 540 would guarantee that any surface with at least one dimension larger than the width of a voxel will intersect at least one crosshair shape 540. It will be appreciated that, in other embodiments, the planes (e.g., 541, 542, and 543) may have an origin that is offset from the center of the voxel.

Figure 5E:
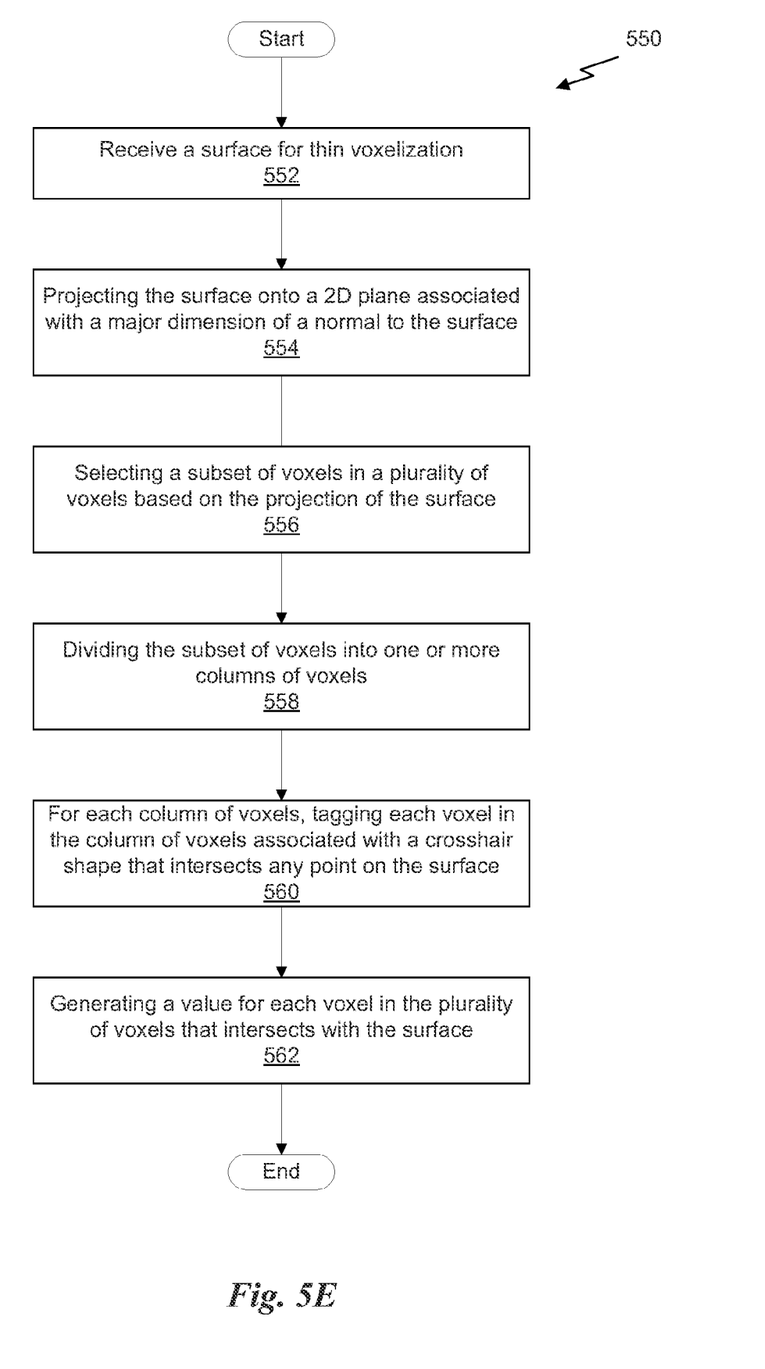
FIG. 5E illustrates a flowchart of a method for performing thin voxelization, in accordance with one embodiment.

FIG. 5E illustrates a flowchart of a method 550 for performing thin voxelization, in accordance with one embodiment. At step 552, a processing engine 210 receives a surface 205 for thin voxelization. At step 554, the processing engine 210 projects the surface 205 onto a 2D plane associated with a major dimension of a normal to the surface 205. At step 556, the processing engine 210 selects a subset of voxels in a plurality of voxels based on the projection of the surface 205. The subset of voxels includes any voxels that intersect with an edge of the projected surface 205 in the direction of the major dimension of the normal of the surface 205. At step 558, the processing engine 210 divides the subset of voxels into one or more columns of voxels. The columns of voxels comprise an array of voxels having a co-linear axis parallel to the major dimension of the normal of the surface 205.

At step 560, for each column of voxels, the processing engine 210 tags each voxel in the column of voxels associated with a crosshair shape 510 that intersects any point on the surface 205. At step 562, the processing engine 210 generates a value for each voxel in the plurality of voxels that is tagged.

Again, the thin voxelization algorithm described above may be implemented in hardware, software, or combinations thereof. More illustrative information will now be set forth regarding various optional architectures and features within which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 6:
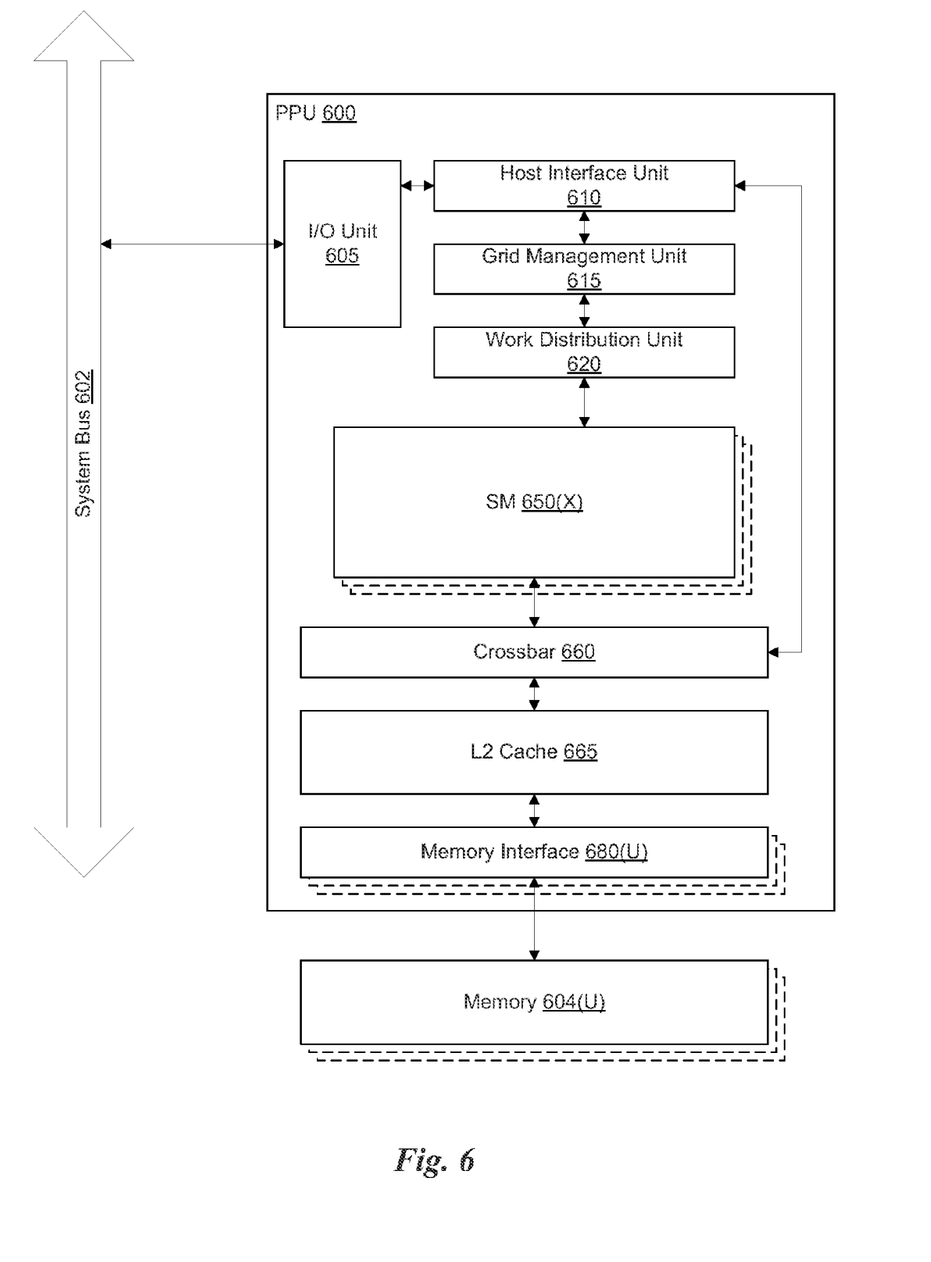
FIG. 6 illustrates a parallel processing unit, according to one embodiment.

FIG. 6 illustrates a parallel processing unit (PPU) 600, according to one embodiment. While a parallel processor is provided herein as an example of the PPU 600, it should be strongly noted that such processor is set forth for illustrative purposes only, and any processor may be employed to supplement and/or substitute for the same. In one embodiment, the PPU 600 is configured to execute a plurality of threads concurrently in two or more streaming multi-processors (SMs) 650. A thread (i.e., a thread of execution) is an instantiation of a set of instructions executing within a particular SM 650. Each SM 650, described below in more detail in conjunction with FIG. 7, may include, but is not limited to, one or more processing cores, one or more load/store units (LSUs), a level-one (L1) cache, shared memory, and the like.

In one embodiment, the PPU 600 includes an input/output (I/O) unit 605 configured to transmit and receive communications (i.e., commands, data, etc.) from a central processing unit (CPU) (not shown) over the system bus 602. The I/O unit 605 may implement a Peripheral Component Interconnect Express (PCIe) interface for communications over a PCIe bus. In alternative embodiments, the I/O unit 605 may implement other types of well-known bus interfaces.

The PPU 600 also includes a host interface unit 610 that decodes the commands and transmits the commands to the grid management unit 615 or other units of the PPU 600 (e.g., memory interface 680) as the commands may specify. The host interface unit 610 is configured route communications between and among the various logical units of the PPU 600.

In one embodiment, a program encoded as a command stream is written to a buffer by the CPU. The buffer is a region in memory, e.g., memory, 604 or system memory, that is accessible (i.e., read/write) by both the CPU and the PPU 600. The CPU writes the command stream to the buffer and then transmits a pointer to the start of the command stream to the PPU 600. The host interface unit 610 provides the grid management unit (GMU) 615 with pointers to one or more streams. The GMU 615 selects one or more streams and is configured to organize the selected streams as a pool of pending grids. The pool of pending grids may include new grids that have not yet been selected for execution and grids that have been partially executed and have been suspended.

A work distribution unit 620 that is coupled between the GMU 615 and the SMs 650 manages a pool of active grids, selecting and dispatching active grids for execution by the SMs 650. Pending grids are transferred to the active grid pool by the GMU 615 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 620. In addition to receiving grids from the host interface unit 610 and the work distribution unit 620, the GMU 610 also receives grids that are dynamically generated by the SMs 650 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 600. An application may include instructions (i.e., API calls) that cause the driver kernel to generate one or more grids for execution. In one embodiment, the PPU 600 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 600 comprises X SMs 650 (X). For example, the PPU 600 may include 15 distinct SMs 650. Each SM 650 is multi-threaded and configured to execute a plurality of threads (e.g., 32 threads) from a particular thread block concurrently. Each of the SMs 650 is connected to a level-two (L2) cache 665 via a crossbar 660 (or other type of interconnect network). The L2 cache 665 is connected to one or more memory interfaces 680. Memory interfaces 680 implement 16, 32, 64, 128-bit data buses, or the like, for high-speed data transfer. In one embodiment, the PPU 600 comprises U memory interfaces 680(U), where each memory interface 680(U) is connected to a corresponding memory device 604(U). For example, PPU 600 may be connected to up to 6 memory devices 604, such as graphics double-data-rate, version 5, synchronous dynamic random access memory (GDDR5 SDRAM).

In one embodiment, the PPU 600 implements a multi-level memory hierarchy. The memory 604 is located off-chip in SDRAM coupled to the PPU 600. Data from the memory 604 may be fetched and stored in the L2 cache 665, which is located on-chip and is shared between the various SMs 650. In one embodiment, each of the SMs 650 also implements an L1 cache. The L1 cache is private memory that is dedicated to a particular SM 650. Each of the L1 caches is coupled to the shared L2 cache 665. Data from the L2 cache 665 may be fetched and stored in each of the L1 caches for processing in the functional units of the SMs 650.

In one embodiment, the PPU 600 comprises a graphics processing unit (GPU). The PPU 600 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 600 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 615 may configure one or more SMs 650 to execute a vertex shader program that processes a number of vertices defined by the model data. In one embodiment, the GMU 615 may configure different SMs 650 to execute different shader programs concurrently. For example, a first subset of SMs 650 may be configured to execute a vertex shader program while a second subset of SMs 650 may be configured to execute a pixel shader program. The first subset of SMs 650 processes vertex data to produce processed vertex data and writes the processed vertex data to the L2 cache 665 and/or the memory 604. After the processed vertex data is rasterized (i.e., transformed from three-dimensional data into two-dimensional data in screen space) to produce fragment data, the second subset of SMs 650 executes a pixel shader to produce processed fragment data, which is then blended with other processed fragment data and written to the frame buffer in memory 604. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 600 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 600 is embodied on a single semiconductor substrate. In another embodiment, the PPU 600 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 600 may be included on a graphics card that includes one or more memory devices 604 such as GDDR5 SDRAM. The graphics card may be configured to interface with a PCIe slot on a motherboard of a desktop computer that includes, e.g., a northbridge chipset and a southbridge chipset. In yet another embodiment, the PPU 600 may be an integrated graphics processing unit (IGPU) included in the chipset (i.e., Northbridge) of the motherboard.

Figure 7:
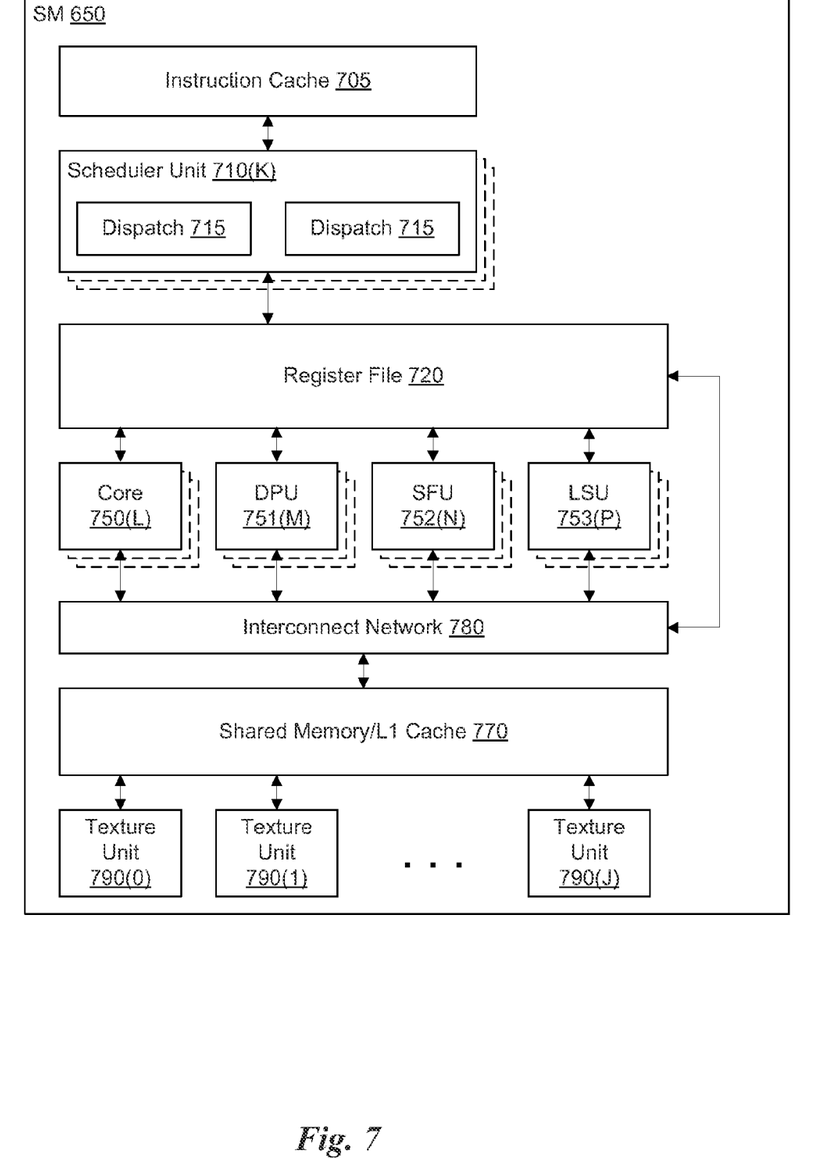
FIG. 7 illustrates the streaming multi-processor of FIG. 6, according to one embodiment.

FIG. 7 illustrates the streaming multi-processor 650 of FIG. 6, according to one embodiment. As shown in FIG. 7, the SM 650 includes an instruction cache 705, one or more scheduler units 710, a register file 720, one or more processing cores 750, one or more double precision units (DPUs) 751, one or more special function units (SFUs) 752, one or more load/store units (LSUs) 753, an interconnect network 780, a shared memory/L1 cache 770, and one or more texture units 790.

As described above, the work distribution unit 620 dispatches active grids for execution on one or more SMs 650 of the PPU 600. The scheduler unit 710 receives the grids from the work distribution unit 620 and manages instruction scheduling for one or more thread blocks of each active grid. The scheduler unit 710 schedules threads for execution in groups of parallel threads, where each group is called a warp. In one embodiment, each warp includes 32 threads. The scheduler unit 710 may manage a plurality of different thread blocks, allocating the thread blocks to warps for execution and then scheduling instructions from the plurality of different warps on the various functional units i.e., cores 750, DPUs 751, SFUs 752, and LSUs 753) during each clock cycle.

In one embodiment, each scheduler unit 710 includes one or more instruction dispatch units 715. Each dispatch unit 715 is configured to transmit instructions to one or more of the functional units. In the embodiment shown in FIG. 7, the scheduler unit 710 includes two dispatch units 715 that enable two different instructions from the same warp to be dispatched during each clock cycle. In alternative embodiments, each scheduler unit 710 may include a single dispatch unit 715 or additional dispatch units 715.

Each SM 650 includes a register file 720 that provides a set of registers for the functional units of the SM 650. In one embodiment, the register file 720 is divided between each of the functional units such that each functional unit is allocated a dedicated portion of the register file 720. In another embodiment, the register file 720 is divided between the different warps being executed by the SM 650. The register file 720 provides temporary storage for operands connected to the data paths of the functional units.

Each SM 650 comprises L processing cores 750. In one embodiment, the SM 650 includes a large number (e.g., 192, etc.) of distinct processing cores 750. Each core 750 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 650 also comprises M DPUs 751 that implement double-precision floating point arithmetic, N SFUs 752 that perform special functions (e.g., copy rectangle, pixel blending operations, and the like), and P LSUs 753 that implement load and store operations between the shared memory/L1 cache 770 and the register file 720. In one embodiment, the SM 650 includes 64 DPUs 751, 32 SFUs 752, and 32 LSUs 753.

Each SM 650 includes an interconnect network 780 that connects each of the functional units to the register file 720 and the shared memory/L1 cache 770. In one embodiment, the interconnect network 780 is a crossbar that can be configured to connect any of the functional units to any of the registers in the register file 720 or the memory locations in shared memory/L1 cache 770.

In one embodiment, the SM 650 is implemented within a GPU. In such an embodiment, the SM 650 comprises texture units 790. The texture units 790 are configured to load texture maps (i.e., a 2D array of voxels) from the memory 604 and sample the texture maps to produce sampled texture values for use in shader programs. The texture units 790 implement texture operations such as anti-aliasing operations using mipmaps (i.e., texture maps of varying levels of detail). In one embodiment, the SM 650 includes 16 texture units 790.

The PPU 600 described above may be configured to perform highly parallel computations much faster than conventional CPUs. Parallel computing has advantages in graphics processing, data compression, biometrics, stream processing algorithms, and the like.

Figure 8:
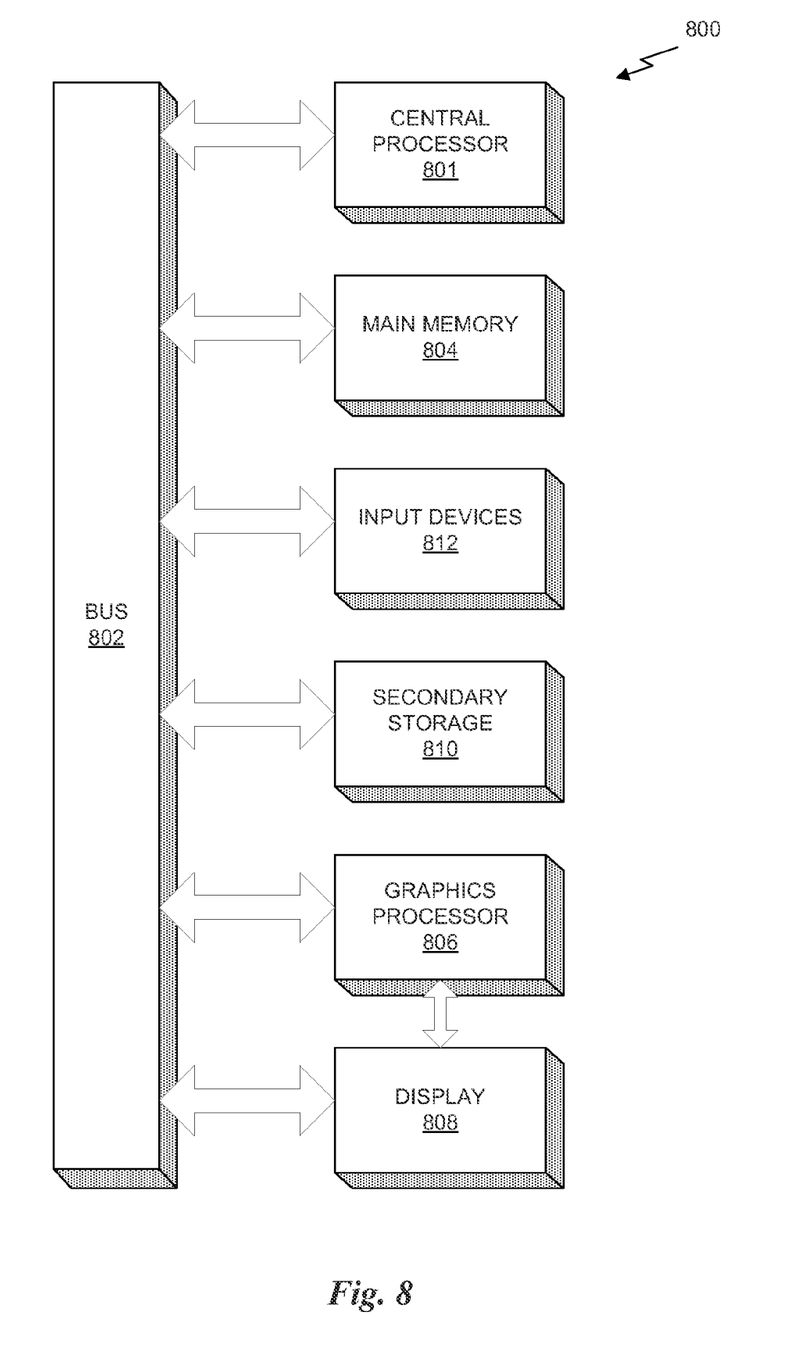
FIG. 8 illustrates an exemplary system in which the various architecture and/or functionality of the various previous embodiments may he implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    receiving a surface at a processing engine;
    mapping, by the processing engine, the surface onto a plurality of volumetric picture elements (voxels) by:
        projecting the surface onto a two dimensional plane associated with a major dimension of a normal to the surface,
        selecting a subset of voxels in the plurality of voxels based on the projection of the surface,
        dividing the subset of voxels into one or more columns of voxels, and
        for each column of voxels, tagging each voxel in the column of voxels associated with a crosshair shape that intersects any point on the surface; and
    generating, by the processing engine, a value for each voxel in the plurality of voxels that is tagged,
    wherein a voxel intersects with the surface when the surface intersects the crosshair shape associated with the voxel, and
    wherein the processing engine is at least one of a software engine executed by a processor or a hardware engine included in the processor.

2. The method of claim 1, wherein the subset of voxels comprises columns of voxels that intersect with edges of the projected surface.

3. The method of claim 1, wherein each voxel in the plurality of voxels is a cubic volume arranged in a regularly spaced three-dimensional array.

4. The method of claim 3, wherein the crosshair shape comprises three orthogonal axes having an origin at the center of the cubic volume.

5. The method of claim 3, wherein the crosshair shape comprises three orthogonal axes having an origin offset from the center of the cubic volume.

6. The method of claim 3, wherein the crosshair shape comprises three axes that intersect at an origin that is offset from the center of the cubic volume, wherein each axis of the three axes comprises a polyline that intersects a first face of the cubic volume at a centroid of the first face and intersects a second face of the cubic volume at a centroid of the second face, and wherein the first face and the second face are opposite faces of the cubic volume.

7. The method of claim 3, wherein the crosshair shape comprises three axes, wherein each axis of the three axes comprises a continuous curve that intersects a first face of the cubic volume at a centroid of the first face and intersects a second face of the cubic volume at a centroid of the second face, and wherein the first face and the second face are opposite faces of the cubic volume.

8. The method of claim 1, wherein the surface comprises a graphics primitive that includes a plurality of vertices, and wherein each vertex in the plurality of vertices is associated with one or more vertex attributes.

9. The method of claim 8, wherein the graphics primitive comprises a triangle having three vertices.

10. The method of claim 1, wherein the value is a scalar value.

11. The method of claim 1, wherein the value is a vector of two or more scalar values.

12. The method of claim 11, wherein the vector represents a color for the voxel having a red component, a blue component, and a green component.

13. The method of claim 12, wherein the color further includes an alpha component that represents transparency.

14. A non-transitory computer-readable storage medium storing instructions that, when executed by a processor, cause the processor to perform steps comprising:
receiving a surface;
mapping the surface onto a plurality of volumetric picture elements (voxels) by:
projecting the surface onto a two dimensional plane associated with a major dimension of a normal to the surface,
selecting a subset of voxels in the plurality of voxels based on the projection of the surface,
dividing the subset of voxels into one or more columns of voxels, and
for each column of voxels, tagging each voxel in the column of voxels associated with a crosshair shape that intersects any point on the surface; and
generating a value for each voxel in the plurality of voxels that is tagged,
wherein a voxel intersects with the surface when the surface intersects the crosshair shape associated with the voxel.

15. The non-transitory computer-readable storage medium of claim 14, wherein each voxel in the plurality of voxels is a cubic volume arranged in a regularly spaced three-dimensional array, and wherein the crosshair shape comprises three orthogonal axes having an origin at the center of the cubic volume.

16. The non-transitory computer-readable storage medium of claim 14, wherein each voxel in the plurality of voxels is a cubic volume arranged in a regularly spaced three-dimensional array, and wherein the crosshair shape comprises three orthogonal axes having an origin offset from the center of the cubic volume.

17. A system, comprising:
a memory storing a data structure representing a plurality of volumetric picture elements (voxels); and
a processor coupled to the memory and configured to:
receive a surface,
map the surface onto the plurality of voxels by:
projecting the surface onto a two dimensional plane associated with a major dimension of a normal to the surface,
selecting a subset of voxels in the plurality of voxels based on e projection of the surface,
dividing the subset of voxels into one or more columns of voxels, and
for each column of voxels, tagging each voxel in the column of voxels associated with a crosshair shape that intersects any point on the surface,
generate a value for each voxel in the plurality of voxels that is tagged, and
store the value in the data structure,
wherein a voxel intersects with the surface when the surface intersects the crosshair shape associated with the voxel.

18. The system claim 17, wherein the processor is a graphics processing unit.

19. The system of claim 17, wherein each voxel in the plurality of voxels is a cubic volume arranged in a regularly spaced three-dimensional array, and wherein the crosshair shape comprises three orthogonal axes having an origin at the center of the cubic volume.

20. The system of claim 17, wherein each voxel in the plurality of voxels is a cubic volume arranged in a regularly spaced three-dimensional array, and wherein the crosshair shape comprises three orthogonal axes having an origin offset from the center of the cubic volume.

* * * * *